(12) United States Patent
Spangler et al.

(10) Patent No.: US 8,707,712 B2
(45) Date of Patent: Apr. 29, 2014

(54) GAS TURBINE ENGINE TURBINE VANE AIRFOIL PROFILE

(75) Inventors: Brandon W. Spangler, Vernon, CT (US); Russell J. Bergman, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 108 days.

(21) Appl. No.: 13/539,873

(22) Filed: Jul. 2, 2012

(65) Prior Publication Data

US 2014/0000286 A1 Jan. 2, 2014

(51) Int. Cl.
*F02C 7/12* (2006.01)

(52) U.S. Cl.
USPC .............. 60/806; 415/115; 416/97 R

(58) Field of Classification Search
USPC ............. 60/806; 415/115–116; 416/95, 96 R, 416/97 A, 97 R, 193 A
See application file for complete search history.

(56) References Cited

U.S. PATENT DOCUMENTS

| | | | | |
|---|---|---|---|---|
| 3,800,864 A * | 4/1974 | Hauser et al. | | 165/47 |
| 4,012,167 A | 3/1977 | Noble | | |
| 4,017,213 A * | 4/1977 | Przirembel | | 416/97 A |
| 4,126,405 A * | 11/1978 | Bobo et al. | | 415/115 |
| 6,120,249 A * | 9/2000 | Hultgren et al. | | 416/97 R |
| 6,241,467 B1 | 6/2001 | Zelesky et al. | | |
| 6,254,333 B1 | 7/2001 | Merry | | |
| 6,398,489 B1 | 6/2002 | Burdgick et al. | | |
| 6,503,054 B1 | 1/2003 | Bielek et al. | | |
| 6,722,851 B1 | 4/2004 | Brittingham et al. | | |
| 7,695,247 B1 | 4/2010 | Liang | | |
| 8,205,458 B2 * | 6/2012 | Lee et al. | | 60/806 |
| 2010/0129196 A1 * | 5/2010 | Johnston et al. | | 415/115 |
| 2012/0177479 A1 * | 7/2012 | Azad et al. | | 415/115 |

* cited by examiner

*Primary Examiner* — Phutthiwat Wongwian
(74) *Attorney, Agent, or Firm* — Carlson, Gaskey & Olds, P.C.

(57) ABSTRACT

A turbine vane for a gas turbine engine includes inner and outer platforms joined by a radially extending airfoil. The airfoil includes leading and trailing edges joined by spaced apart pressure and suction sides to provide an exterior airfoil surface. The inner and outer platforms respectively include inner and outer sets of film cooling holes. One of the inner and outer sets of film cooling holes are formed in substantial conformance with platform cooling hole locations described by one of the sets of Cartesian coordinates set forth in Tables 1 and 2. The Cartesian coordinates are provided by an axial coordinate, a circumferential coordinate, and a radial coordinate, relative to a zero-coordinate. The cooling holes with Cartesian coordinates in Tables 1 and 2 have a diametrical surface tolerance relative to the specified coordinates of 0.200 inches (5.08 mm).

17 Claims, 5 Drawing Sheets

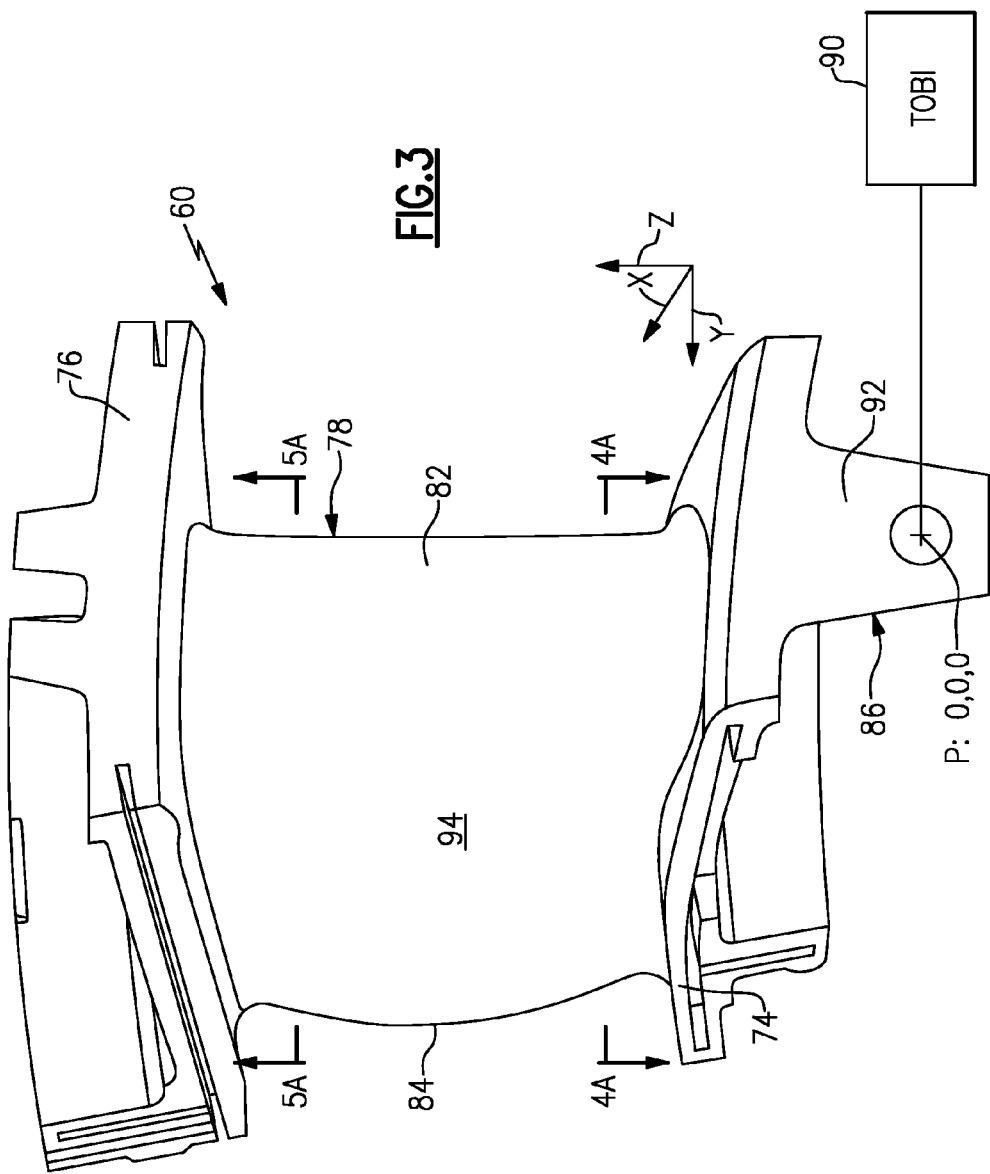

GAS TURBINE ENGINE TURBINE VANE AIRFOIL PROFILE

CROSS-REFERENCE TO RELATED APPLICATION

This application is related to co-pending application, entitled "GAS TURBINE ENGINE TURBINE VANE AIRFOIL PROFILE by United Technologies Corporation, application Ser. No. 13/539,917, filed Jul. 2, 2012.

BACKGROUND

This disclosure relates to a gas turbine engine, and more particularly to turbine vane platform cooling arrangements that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In turbine vane design, there is an emphasis on stress-resistant airfoil and platform designs, with reduced losses, increased lift and turning efficiency, and improved turbine performance and service life. The vane platforms include film cooling features to provide a boundary layer of film cooling fluid along the surface of the vane, which protects the underlying vane substrate from the hot combustion gases. To achieve these results, non-linear flow analyses and complex strain modeling are required, making practical results difficult to predict. Vane loading and temperature considerations also impose substantial design limitations, which cannot easily be generalized from one system to another.

SUMMARY

In one exemplary embodiment, a turbine vane for a gas turbine engine includes inner and outer platforms joined by a radially extending airfoil. The airfoil includes leading and trailing edges joined by spaced apart pressure and suction sides to provide an exterior airfoil surface. The inner and outer platforms respectively include inner and outer sets of film cooling holes. One of the inner and outer sets of film cooling holes are formed in substantial conformance with platform cooling hole locations described by one of the sets of Cartesian coordinates set forth in Tables 1 and 2. The Cartesian coordinates are provided by an axial coordinate, a circumferential coordinate, and a radial coordinate, relative to a zero-coordinate. The cooling holes with Cartesian coordinates in Tables 1 and 2 have a diametrical surface tolerance relative to the specified coordinates of 0.200 inches (5.08 mm).

In a further embodiment of any of the above, the turbine vane is a first stage turbine vane.

In a further embodiment of any of the above, the zero-coordinate corresponds to a TOBI pin hole.

In a further embodiment of any of the above, the inner and outer platforms respectively include inner and outer platform perimeters. The inner and outer sets of cooling holes respectively lie within the inner and outer platform perimeters regardless of the tolerance.

In a further embodiment of any of the above, spacing between edges of adjacent cooling holes is maintained by at least 0.015 inch (0.381 mm).

In a further embodiment of any of the above, the film cooling holes have a diameter of 0.010-0.035 inch (0.25-0.89 mm).

In a further embodiment of any of the above, some of the film cooling holes are conical and other of the film cooling holes are cylindrical.

In a further embodiment of any of the above, the cooling holes are directed away from the airfoil and from the leading edge toward the trailing edge, and the cooling holes are angled relative to the platform surface 10°-45°.

In another exemplary embodiment, a gas turbine engine includes a compressor section. A combustor is fluidly connected to the compressor section. A turbine section is fluidly connected to the combustor. The turbine section includes a high pressure turbine coupled to the high pressure compressor via a shaft. The turbine section includes a low pressure turbine. The high pressure turbine includes an array of turbine vanes. Each turbine vane has inner and outer platforms joined by a radially extending airfoil. The airfoil includes leading and trailing edges joined by spaced apart pressure and suction sides to provide an exterior airfoil surface. The inner and outer platforms respectively include inner and outer sets of film cooling holes, wherein one of the inner and outer sets of film cooling holes are formed in substantial conformance with platform cooling hole locations described by one of the sets of Cartesian coordinates set forth in Tables 1 and 2. The Cartesian coordinates are provided by an axial coordinate, a circumferential coordinate, and a radial coordinate, relative to a zero-coordinate. The cooling holes with Cartesian coordinates in Tables 1 and 2 have a diametrical surface tolerance relative to the specified coordinates of 0.200 inches (5.08 mm).

In a further embodiment of any of the above, the array is a first stage array of turbine vanes.

In a further embodiment of any of the above, the high pressure turbine consists of two arrays of turbine blades and two arrays of fixed stator vanes.

In a further embodiment of any of the above, the zero-coordinate corresponds to a TOBI pin hole.

In a further embodiment of any of the above, the inner and outer platforms respectively include inner and outer platform perimeters. The inner and outer sets of cooling holes respectively lie within the inner and outer platform perimeters regardless of the tolerance.

In a further embodiment of any of the above, spacing between adjacent cooling holes is maintained by at least 0.015 inch (0.381 mm).

In a further embodiment of any of the above, the film cooling holes have a diameter of 0.010-0.035 inch (0.25-0.89 mm).

In a further embodiment of any of the above, some of the film cooling holes are conical and other of the film cooling holes are cylindrical.

In a further embodiment of any of the above, the cooling holes are directed away from the airfoil and from the leading edge toward the trailing edge. The cooling holes are angled relative to the platform surface 10°-45°.

BRIEF DESCRIPTION OF THE DRAWINGS

The disclosure can be further understood by reference to the following detailed description when considered in connection with the accompanying drawings wherein:

FIG. 3 is a perspective view of a turbine vane for the high pressure turbine section shown in FIG. 2.

DETAILED DESCRIPTION

Figure 1:
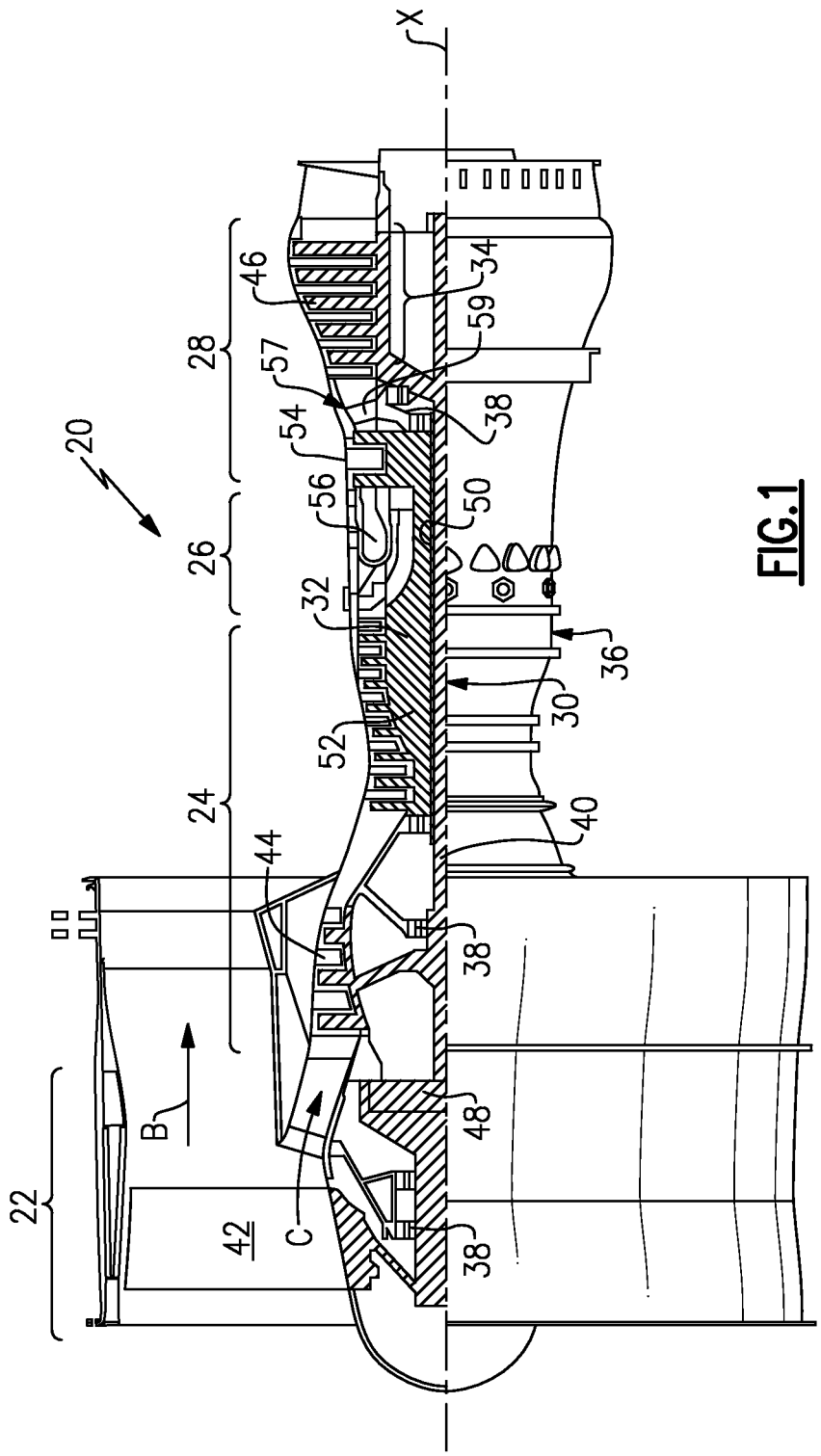
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7) 0.5]. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
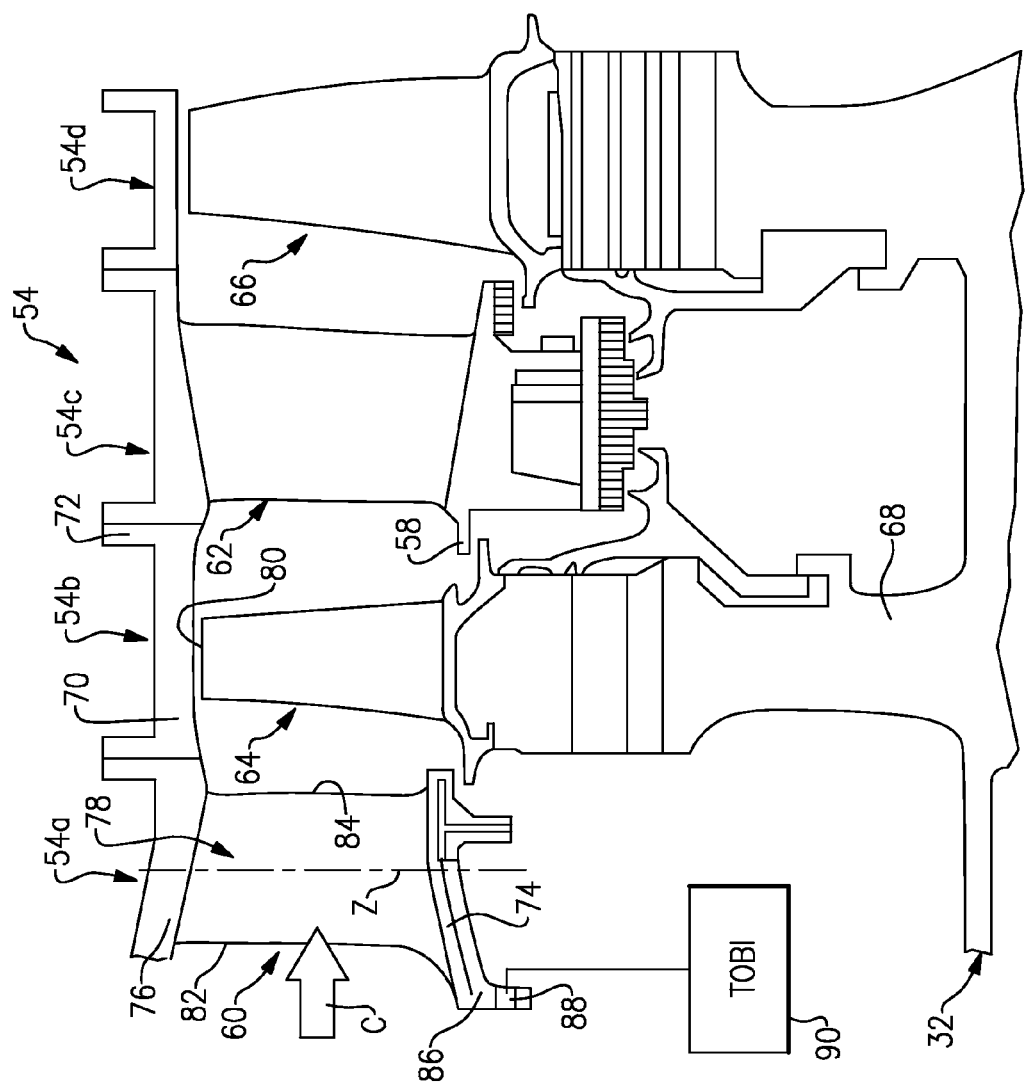
FIG. 2 is a cross-sectional view through a high pressure turbine section.

Referring to FIG. 2, a cross-sectional view through a high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62. A platform 58 of the second fixed vane array 62 is arranged in an overlapping relationship with the turbine blades 64, 66.

The turbine blades each include a tip 80 adjacent to a blade outer air seal 70 of a case structure 72. The first and second stage arrays 54a, 54c of turbine vanes and first and second stage arrays 54b, 54d of turbine blades are arranged within a core flow path C and are operatively connected to a spool 32.

Each vane 60 includes an inner platform 74 and an outer platform 76 respectively defining inner and outer flow paths. The platforms 74, 76 are interconnected by an airfoil 78 extending in a radial direction Z. It should be understood that the turbine vanes may be discrete from one another or arranged in integrated clusters. The airfoil 78 provides leading and trailing edges 82, 84.

In the example, the inner platform 74 includes a radially inwardly extending tab 86 providing a tangential on-board injector (TOBI) pin hole 88 that is used to fasten the vane 60 to a TOBI 90. The TOBI 90 provides cooling fluid to the vane 60. The center of the TOBI pin hole 88, corresponds to a point P, which provides the reference zero-coordinate for the vane cooling holes, best shown in FIG. 3.

Figure 4A:
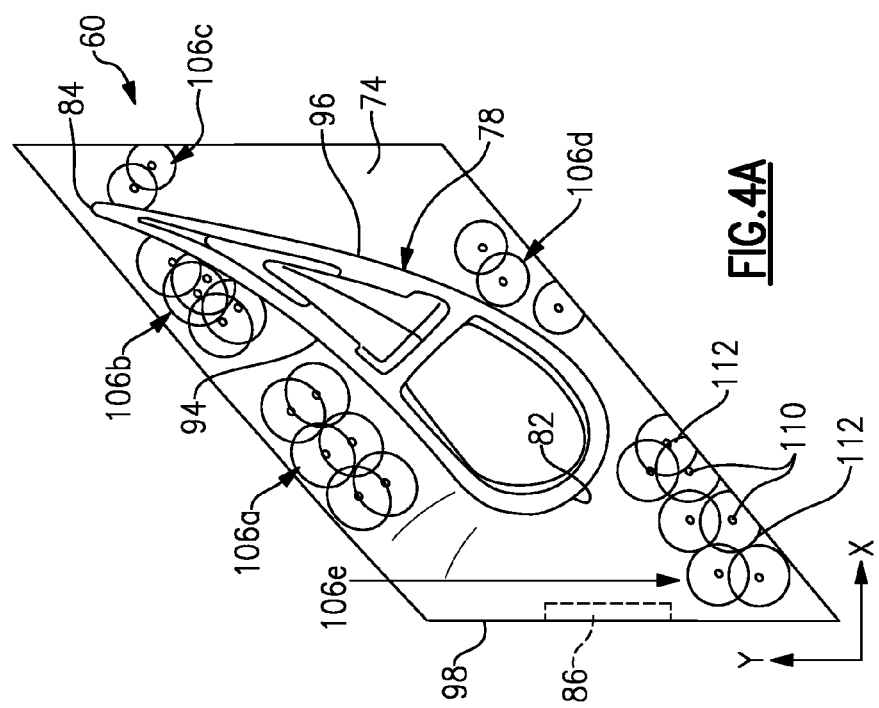
FIG. 4A is a view of the turbine vane taken along line 4A-4A of FIG. 3.

Referring to FIG. 4A, the airfoil 78 is provided between pressure (concave) and suction (convex) sides 94, 96 in an airfoil thickness direction, which is generally perpendicular to a chord-wise direction provided between the leading and trailing edges 82, 84. Multiple turbine vanes 60 are arranged circumferentially in a circumferential direction Y. The airfoil 78 typically includes multiple film cooling holes (not shown).

The turbine vanes 60 are constructed from a high strength, heat resistant material such as a nickel-based or cobalt-based superalloy, or of a high temperature, stress resistant ceramic or composite material. In cooled configurations, internal fluid passages and external cooling apertures provide for a combination of convection and film cooling. In addition, one or more thermal barrier coatings, abrasion-resistant coatings or other protective coatings may be applied to the turbine vane 60.

Figure 5A:
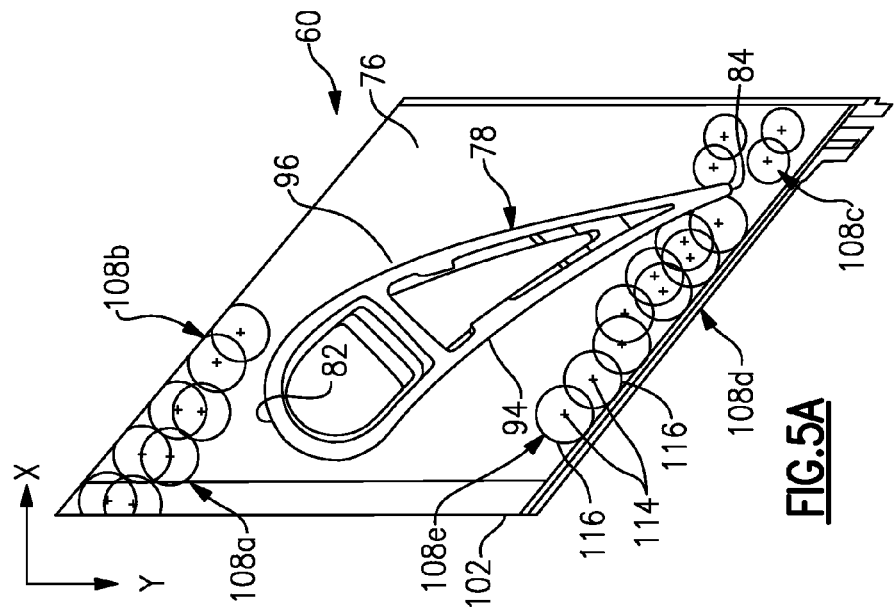
FIG. 5A is a view of the turbine vane taken along line 5A-5A of FIG. 3.
Figure 4B:
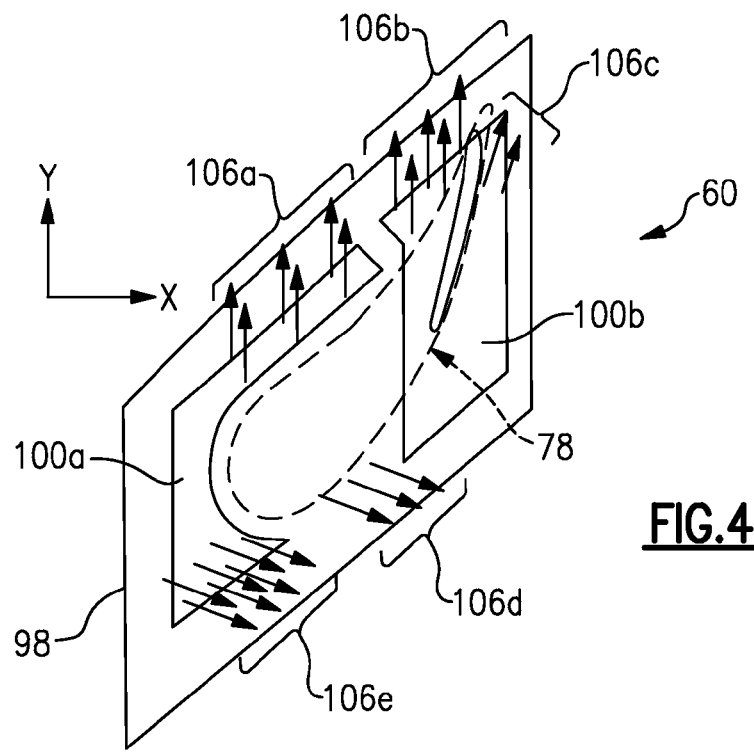
FIG. 4B is a schematic view of cooling holes on an inner platform, shown in FIG. 4A.
Figure 5B:
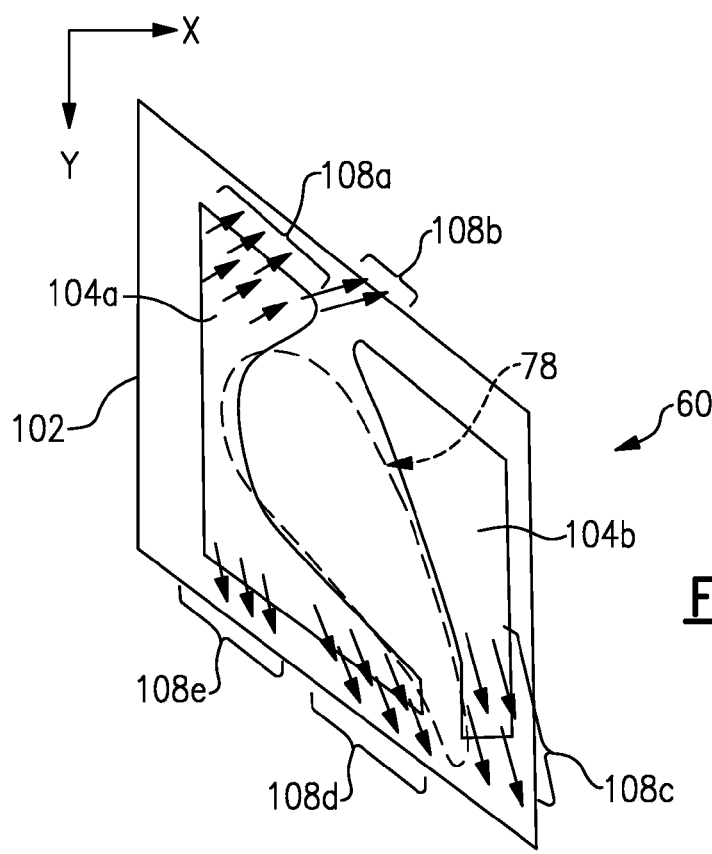
FIG. 5B is a schematic view of cooling holes on an outer platform, shown in FIG. 5A.

The inner and outer platforms 74, 76 include cooling holes 110, 114, respectively, as shown in FIGS. 4A and 5A. The inner platform cooling holes 110 are in fluid communication with inner platform cooling passages 100, as shown in FIG. 4B. Similarly, the outer platform cooling holes 114 are in fluid communication with outer platform cooling passages 104, as shown in FIG. 5B. The cooling holes each include a diameter (where the holes break the surface of the platform) of 0.010-0.035 inch (0.25-0.89 mm), in one example. The general orientation of the cooling holes is shown by the arrows in FIGS. 4B and 5B. Generally, the cooling holes are directed away from the airfoil 78 and from the leading edge 82 toward the trailing edge 84. The angle of the cooling holes relative to the platform surface may be 10°-45°, in one example.

The cooling holes 110, 114 are arranged to produce boundary layers of cooling fluid on the platforms to provide the desired cooling. Referring to FIGS. 4A and 4B, the cooling holes 110 in the inner platform 74 are arranged in clusters 106a-106e. In one example, the clusters 106a, 106b and 106e have conical holes with the cooling hole diameter increasing as the hole nears the platform surface. The clusters 106c, 106d have cylindrical cooling holes. Referring to FIGS. 5A and 5B, the cooling holes 114 in the outer platform 76 are arranged in clusters 108a-108e. In one example, the clusters 108a, 108d and 108e have conical holes with the cooling hole diameter increasing as the hole nears the platform surface. The clusters 108b, 108c have cylindrical cooling holes. The conical holes typically provide better film coverage as compared to a round hole of the same size. Conical holes are used where it is desirable to better insulate the platform from the hot combustion gases. The round holes provide higher velocity cooling flow as compared to a conical hole of the same size. Round holes are used at locations where increased velocity is needed to better match the velocity of fluid along the core flow path C.

The locations of the cooling holes 110, 114 are described in terms of Cartesian coordinates defined along x, y and z axes, which respectively correspond to the axial (x), circumferential (y) and radial (z) directions shown in the Figures. The locations of the inner and outer cooling holes 110, 114 correspond to the centerline of holes where the holes break the surface of the platform. The coordinates of the inner and outer cooling holes 110, 114 are respectively set forth in Tables 1 and 2 (in inches), which provide the nominal axial (x), circumferential (y) and radial (z) coordinates relative to the point P on a cold, uncoated, stationary vane. Each row in Tables 1 and 2 corresponds to a cooling hole location. The coordinates can be converted to metric (mm) by multiplying by 25.4, or could be converted to any other units. A fillet is provided between the airfoil 78 and the inner and outer platforms 74, 76. The half of the fillet adjacent to each platform is generally considered to be a part of the platform.

TABLE 1

| Hole No. | X | Y | Z |
| --- | --- | --- | --- |
| 1 | 0.062 | 1.664 | 0.646 |
| 2 | 0.106 | 1.544 | 0.673 |
| 3 | 0.227 | 1.563 | 0.699 |
| 4 | 0.227 | 1.445 | 0.714 |
| 5 | 0.364 | 1.435 | 0.746 |
| 6 | 0.354 | 1.316 | 0.757 |
| 7 | 0.528 | 1.301 | 0.798 |
| 8 | 0.834 | 0.116 | 0.825 |
| 9 | 0.926 | 0.033 | 0.825 |
| 10 | 0.780 | 0.092 | 0.823 |
| 11 | 0.869 | 0.023 | 0.816 |
| 12 | 0.958 | −0.049 | 0.810 |
| 13 | 1.244 | −0.172 | 0.792 |
| 14 | 1.208 | −0.263 | 0.779 |
| 15 | 0.576 | 0.375 | 0.830 |
| 16 | 0.543 | 0.293 | 0.817 |
| 17 | 0.444 | 0.471 | 0.810 |
| 18 | 0.414 | 0.385 | 0.793 |

TABLE 1-continued

| Hole No. | X | Y | Z |
|---|---|---|---|
| 19 | 0.325 | 0.566 | 0.795 |
| 20 | 0.289 | 0.487 | 0.768 |
| 21 | 0.830 | 1.052 | 0.841 |
| 22 | 0.913 | 0.937 | 0.846 |
| 23 | 0.974 | 0.836 | 0.849 |

TABLE 2

| Hole No. | X | Y | Z |
|---|---|---|---|
| 1 | 0.128 | 1.734 | 2.364 |
| 2 | 0.196 | 1.389 | 2.393 |
| 3 | 0.231 | 1.498 | 2.382 |
| 4 | 0.260 | 1.630 | 2.365 |
| 5 | 0.408 | 1.403 | 2.364 |
| 6 | 0.412 | 1.506 | 2.353 |
| 7 | 0.736 | 0.006 | 2.309 |
| 8 | 0.847 | −0.089 | 2.281 |
| 9 | 0.958 | −0.188 | 2.251 |
| 10 | 0.789 | −0.113 | 2.288 |
| 11 | 0.899 | −0.208 | 2.259 |
| 12 | 1.010 | −0.305 | 2.228 |
| 13 | 0.388 | 0.189 | 2.382 |
| 14 | 0.501 | 0.098 | 2.357 |
| 15 | 0.619 | 0.002 | 2.329 |
| 16 | 0.574 | 1.364 | 2.339 |
| 17 | 0.671 | 1.287 | 2.328 |
| 18 | 1.216 | −0.312 | 2.201 |
| 19 | 1.317 | −0.348 | 2.204 |
| 20 | 1.233 | −0.495 | 2.179 |
| 21 | 1.336 | −0.539 | 2.177 |

The coordinates define break out points of the cooling holes on a cold, uncoated, stationary vane. Additional elements such as additional cooling holes, protective coatings, fillets and seal structures may also be formed onto the specified platform surface, or onto an adjacent airfoil surface, but these elements are not necessarily described by the coordinates.

Due to manufacturing tolerances, the external breakout of the centerline of the hole can fall within a 0.200 inch (5.08 mm) diameter circle inscribed on the surface of the part. The tolerances about the cooling holes 110, 114 are schematically illustrated by the circles 112, 116 circumscribing the cooling holes. However, the edge-to-edge spacing between adjacent cooling holes of at least 0.015 inch (0.381 mm) must be maintained. Additionally, the cooling holes are also located within the inner and outer platform perimeters 98, 102 regardless of the tolerance. This tolerance is generally constant or not scalable, and applies to each of the specified platform surfaces, regardless of size.

Substantial conformance is based on points representing the cooling hole locations, for example in inches or millimeters, as determined by selecting particular values of the scaling parameters. A substantially conforming airfoil, blade or vane structure has cooling holes that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

Although an example embodiment has been disclosed, a worker of ordinary skill in this art would recognize that certain modifications would come within the scope of the claims. For that reason, the following claims should be studied to determine their true scope and content.

What is claimed is:

1. A turbine vane for a gas turbine engine comprising:
    inner and outer platforms joined by a radially extending airfoil, the airfoil including leading and trailing edges joined by spaced apart pressure and suction sides to provide an exterior airfoil surface; and
    wherein the inner and outer platforms respectively include inner and outer sets of film cooling holes, wherein one of the inner and outer sets of film cooling holes are formed in substantial conformance with platform cooling hole locations described by one of the sets of Cartesian coordinates set forth in Tables 1 and 2, the Cartesian coordinates provided by an axial coordinate, a circumferential coordinate, and a radial coordinate, relative to a zero-coordinate, and the cooling holes with Cartesian coordinates in Tables 1 and 2 have a diametrical surface tolerance relative to the specified coordinates of 0.200 inches (5.08 mm).

2. The turbine vane according to claim 1, wherein the turbine vane is a first stage turbine vane.

3. The turbine vane according to claim 1, wherein the zero-coordinate corresponds to a tangential on-board injector (TOBI) pin hole.

4. The turbine vane according to claim 1, wherein the inner and outer platforms respectively include inner and outer platform perimeters, and the inner and outer sets of cooling holes respectively lie within the inner and outer platform perimeters regardless of the tolerance.

5. The turbine vane according to claim 1, wherein spacing between edges of adjacent cooling holes is maintained by at least 0.015 inch (0.381 mm).

6. The turbine vane according to claim 1, wherein the film cooling holes have a diameter of 0.010-0.035 inch (0.25-0.89 mm).

7. The turbine vane according to claim 6, wherein some of the film cooling holes are conical and other of the film cooling holes are cylindrical.

8. The turbine vane according to claim 6, wherein the cooling holes are directed away from the airfoil and from the leading edge toward the trailing edge, and the cooling holes are angled relative to the platform surface 10°-45°.

9. A gas turbine engine comprising:
    a compressor section;
    a combustor fluidly connected to the compressor section;
    a turbine section fluidly connected to the combustor, the turbine section comprising:
        a high pressure turbine coupled to the high pressure compressor via a shaft;
        a low pressure turbine; and
    wherein the high pressure turbine includes an array of turbine vanes, each turbine vane having inner and outer platforms joined by a radially extending airfoil, the airfoil including leading and trailing edges joined by spaced apart pressure and suction sides to provide an exterior airfoil surface; and wherein the inner and outer platforms respectively include inner and outer sets of film cooling holes, wherein one of the inner and outer sets of film cooling holes are formed in substantial conformance with platform cooling hole locations described by one of the sets of Cartesian coordinates set forth in Tables 1 and 2, the Cartesian coordinates provided by an axial coordinate, a circumferential coordinate, and a radial coordinate, relative to a zero-coordinate, and the cooling holes with Cartesian coordinates in Tables 1 and 2 have a diametrical surface tolerance relative to the specified coordinates of 0.200 inches (5.08 mm).

10. The gas turbine engine according to claim 9, wherein the array is a first stage array of turbine vanes.

11. The gas turbine engine according to claim 10, wherein the high pressure turbine consists of two arrays of turbine blades and two arrays of fixed stator vanes.

12. The turbine vane according to claim 9, wherein the zero-coordinate corresponds to a tangential on-board injector (TOBI) pin hole.

13. The turbine vane according to claim 9, wherein the inner and outer platforms respectively include inner and outer platform perimeters, and the inner and outer sets of cooling holes respectively lie within the inner and outer platform perimeters regardless of the tolerance.

14. The turbine vane according to claim 9, wherein spacing between adjacent cooling holes is maintained by at least 0.015 inch (0.381 mm).

15. The turbine vane according to claim 9, wherein the film cooling holes have a diameter of 0.010-0.035 inch (0.25-0.89 mm).

16. The turbine vane according to claim 15, wherein some of the film cooling holes are conical and other of the film cooling holes are cylindrical.

17. The turbine vane according to claim 15, wherein the cooling holes are directed away from the airfoil and from the leading edge toward the trailing edge, and the cooling holes are angled relative to the platform surface 10°-45°.

* * * * *